US012074783B2

United States Patent
Ruan

(10) Patent No.: US 12,074,783 B2
(45) Date of Patent: Aug. 27, 2024

(54) DEVICE, METHOD, MEDIUM AND COMPUTER PROGRAM PRODUCT FOR VOICE DATA TRANSMISSION

(71) Applicant: ARRIS Enterprises LLC, Suwanee, GA (US)

(72) Inventor: Rongbin Ruan, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 287 days.

(21) Appl. No.: 17/571,977

(22) Filed: Jan. 10, 2022

(65) Prior Publication Data

US 2022/0224634 A1    Jul. 14, 2022

(30) Foreign Application Priority Data

Jan. 11, 2021    (CN) .......................... 202110029842.X

(51) Int. Cl.
  *H04L 12/28*    (2006.01)
  *H04L 45/00*    (2022.01)
  *H04M 3/42*    (2006.01)
(52) U.S. Cl.
  CPC ........ *H04L 45/20* (2013.01); *H04M 3/42348* (2013.01)
(58) Field of Classification Search
  CPC ... H04L 45/20; H04L 45/025; H04L 47/2416; H04L 47/286; H04L 65/1069;
  (Continued)

(56) References Cited

U.S. PATENT DOCUMENTS

| | | |
|---|---|---|
| 6,760,309 B1 | 7/2004 | Rochberger et al. |
| 2007/0297401 A1 | 12/2007 | Bosch et al. |

(Continued)

FOREIGN PATENT DOCUMENTS

CA    2242759 C  * 10/2000   .......... H04Q 3/0029

OTHER PUBLICATIONS

International Search Report and the Written Opinion of the International Searching Authority dated Apr. 7, 2022 in International (PCT) Application No. PCT/US2022/011783.

(Continued)

*Primary Examiner* — Lan-Huong Truong
(74) *Attorney, Agent, or Firm* — Wenderoth, Lind & Ponack, L.L.P.

(57) ABSTRACT

Device, method, medium and computer program product for voice data transmission. The device includes a processor that executes instructions in memory to: establish a call connection for voice data transmission with another device, wherein the said device parses and identifies the number of the said another device to determine whether the voice data transmission is associated with an international call, and when the voice data transmission is determined to be associated with an international call, the determine hop limit value for the voice data transmission as a first value greater than the default hop limit value; or when the voice data transmission is determined to not be associated with an international call, the hop limit value for the voice data transmission is determined as the default value; and generate packets for sending voice data based on the hop limit value determined when the call connection is established.

19 Claims, 2 Drawing Sheets

(58) Field of Classification Search
CPC ......... H04M 3/42348; H04M 2201/18; H04M 7/0075; H04M 3/4228
See application file for complete search history.

(56) References Cited

U.S. PATENT DOCUMENTS

2018/0048666 A1\* 2/2018 Alderson ................ H04L 45/20
2023/0353455 A1\* 11/2023 Zhu ..................... G06F 9/45558

OTHER PUBLICATIONS

International Preliminary Report on Patentability and Written Opinion issued Jul. 20, 2023 in International Application No. PCT/US2022/011783.

\* cited by examiner

DEVICE, METHOD, MEDIUM AND COMPUTER PROGRAM PRODUCT FOR VOICE DATA TRANSMISSION

TECHNICAL FIELD

The present disclosure relates to the device, method, medium and computer program product for voice data transmission. More specifically, the present disclosure relates to a scheme for adjusting the hop limit value of one or more data packets used to transmit voice data in voice data transmission that may involve international calls.

BACKGROUND ART

When a data packet is transmitted in the network, the data packet may need to pass through multiple forwarding nodes (such as routers) to reach the destination from the sender. However, due to various reasons (for example, the failure of the forwarding device in the network, configuration errors, etc.), ping-pong routing or loopback routing may occur in the network, resulting in infinite loops of the data packet in a closed transmission loop and failure to reach the destination. Therefore, a hop limit value is introduced to limit the number of forwarding hops/lifetime of the data packet in the network. When a data packet (such as an Internet Protocol (IP) packet) is transmitted in the network, each time it passes through a forwarding node (such as a router), the hop limit value of the data packet is reduced by one. If the hop limit value of a data packet becomes zero, the data packet will be discarded. Traditionally, the hop limit value is statically set to a default value (for example, 64), and the setting of the hop limit value is independent of the destination of the data packet.

However, with the development of the network, more and more application scenarios have emerged, and more and more devices have been added to the computer network. In order to adapt to these changes, the structure of the network becomes more and more complex. For example, more subnets are generated and more forwarding devices are added to the network, which results in data packet transmission possibly experiencing more hops. In particular, in a scenario where a voice session is established via the Internet (such as IP phone, video call, etc.), the voice data packet transmission may experience more hops.

In this case, if the traditional scheme of statically setting to the default value of the hop limit continues to be used, it may cause the voice data packet to be inappropriately discarded before reaching the destination, resulting in a decrease in call quality.

Therefore, a scheme for setting a hop limit value suitable for more complex networks is needed.

SUMMARY OF THE INVENTION

The present disclosure proposes a scheme for dynamically setting the hop limit value for voice data packets based on a call.

According to one aspect of the present disclosure, a device for voice data transmission is proposed. The said device includes a processor and a memory storing computer-executable instructions; when the said computer-executable instructions are executed by the said processor, the device performs the following operations: establishes a call connection for voice data transmission with another device; in establishing the said call connection: the said device parses and identifies the number of the said another device to determine whether the said voice data transmission is associated with an international call, and in response to the confirmation that the said voice data transmission is associated with an international call upon parsing the said number, the hop limit value for the said voice data transmission is determined as a first value greater than the default hop limit value; or in response to the confirmation that the said voice data transmission is not associated with an international call upon parsing the said number, the hop limit value for the said voice data transmission is determined as the default hop limit value; and one or more data packets for sending voice data are generated based on the hop limit value determined when the said call connection is established.

In some embodiments, parsing and identifying the number of the said another device includes: determining whether the country code contained in the said number matches any country code in the country code list stored in the said device, and responding to the said number with a country code matching any country code in the said country code list to confirm that the said voice data transmission is associated with an international call.

In some embodiments, parsing and identifying the number of the said another device includes: determining whether the main part of the said number starts with a predetermined code, and responding to the said number with the main part starting with the predetermined code to confirm that the said voice data transmission is associated with an international call.

In some embodiments, the said first value is less than a predetermined threshold, the predetermined threshold is less than the maximum hop limit value specified by the protocol used to establish the said call connection, and/or the said first value is a pre-configured value.

In some embodiments, the said device is the calling party's device or the called party's device of the call.

In some embodiments, the said hop limit value is the Time-to-Live (TTL) value.

According to one aspect of the present disclosure, a method for voice data transmission is proposed, which comprises: one end of the call for voice data transmission establishing a call connection with the other end of the said call; in establishing the said call connection: one end of the said call parses and identifies the number of the said other end to determine whether the said voice data transmission is associated with an international call, and in response to the confirmation that the said voice data transmission is associated with an international call upon parsing the said number, the hop limit value for the said voice data transmission is determined as a first value greater than the default hop limit value; or in response to the confirmation that the said voice data transmission is not associated with an international call upon parsing the said number, the hop limit value for the said voice data transmission is determined as the default hop limit value; and one or more packets for sending voice data are generated based on the hop limit value determined when the said call connection is established.

In some embodiments, parsing and identifying the number of the said other end includes: determining whether the country code contained in the said number matches any country code in the country code list stored in the said device, and responding to the said number with a country code matching any country code in the said country code list to confirm that the said voice data transmission is associated with an international call.

In some embodiments, parsing and identifying the number of the said other end includes: determining whether the main part of the said number starts with a predetermined code, and responding to the said number with the main part starting with the predetermined code to confirm that the said voice data transmission is associated with an international call.

In some embodiments, the said first value is less than a predetermined threshold, the predetermined threshold is less than the maximum hop limit value specified by the protocol used to establish the said call connection, and/or the said first value is a pre-configured value.

In some embodiments, the said method is implemented by the calling party or the called party of the said call.

In some embodiments, the said hop limit value is the Time-to-Live (TTL) value.

According to one aspect of the present disclosure, a computer-readable medium storing computer-executable instructions is proposed. When executed by a processor, the said computer-executable instructions cause the said processor to implement a method for voice data transmission, wherein one end of a call for voice data transmission establishes a call connection with the other end of the said call; in establishing the said call connection: one end of the said call parses and identifies the number of the said other end to determine whether the said voice data transmission is associated with an international call, and in response to the confirmation that the said voice data transmission is associated with an international call upon parsing the said number, the hop limit value for the said voice data transmission is determined as a first value greater than the default hop limit value; or in response to the confirmation that the said voice data transmission is not associated with an international call upon parsing the said number, the hop limit value for the said voice data transmission is determined as the default hop limit value; and one or more packets for sending voice data are generated based on the hop limit value determined when the said call connection is established.

In some embodiments, parsing and identifying the number of the said other end includes: determining whether the country code contained in the said number matches any country code in the country code list stored in the said device, and responding to the said number with a country code matching any country code in the said country code list to confirm that the said voice data transmission is associated with an international call.

In some embodiments, parsing and identifying the number of the said other end includes: determining whether the main part of the said number starts with a predetermined code, and responding to the said number with the main part starting with the predetermined code to confirm that the said voice data transmission is associated with an international call.

In some embodiments, the said first value is less than a predetermined threshold, the predetermined threshold is less than the maximum hop limit value specified by the protocol used to establish the said call connection, and/or the said first value is a pre-configured value.

In some embodiments, the said method is implemented by the calling party or the called party of the said call.

In some embodiments, the said hop limit value is the Time-to-Live (TTL) value.

According to one aspect of the present disclosure, a computer program product is proposed, comprising a computer program or instructions, characterized in that, when the said computer program or instructions are executed by a processor, the steps of the aforementioned method are realized.

DESCRIPTION OF ATTACHED DRAWINGS

The drawings that are incorporated in the descriptions and constitute a part of the descriptions illustrate embodiments of the present disclosure, and together with the description, serve to explain the principle of the present disclosure.

SPECIFIC EMBODIMENTS

Hereinafter, embodiments of the present disclosure will be described in detail with reference to the accompanying drawings.

In this section, representative applications of the devices and methods according to the embodiments described herein are provided. These examples are provided only to add context and to help understand the said embodiments. It will therefore be obvious to those skilled in the art that the embodiments described in the present disclosure can be implemented without some or all of these specific details. In other cases, well-known aspects are not elaborated to avoid unnecessarily obscuring the embodiments described in the present disclosure. Other applications are also possible, so that the following examples should not be considered restrictive.

Please note that similar reference numbers and letters refer to similar items in the figure, so once an item is defined in a figure, it does not need to be discussed in subsequent figures.

As explained above, as the network structure becomes more and more complex, in scenarios where voice sessions are established via the Internet (such as IP phones, video calls, etc.), the transmission of voice data packets may experience more hops than in traditional scenarios, resulting in the traditional default hop limit value being insufficient to support some voice data packets to reach their destination smoothly. In particular, in the case of an international long-distance call via a computer network, voice data packets may have to cross a very complex network to reach the destination.

Figure 1:
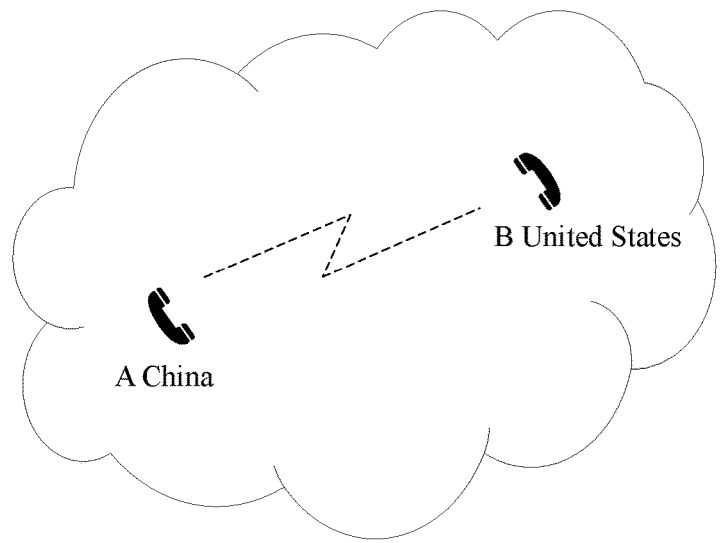
FIG. 1 shows the schematic diagram of a communication scenario according to an embodiment of the present disclosure.

As shown in the communication scenario in FIG. 1, when A located in China calls B located in the United States via the Internet, the voice data packet may undergo a very large number of forwarding, that is, it may experience more hops than a non-long-distance call to reach the destination in the United States. This situation may become more prominent when the network is abnormal (for example, network congestion causing some shorter forwarding paths to be unusable). Therefore, in the case of international long-distance calls, if the traditional statically set default hop limit value is used, the voice data packet is likely to be inappropriately discarded before reaching the destination, resulting in a decrease in call quality.

In order to overcome these shortcomings of the prior art, the present disclosure proposes a scheme for flexible adjustment of the hop limit value. The basic idea of the scheme of the present disclosure is as follows: during the establishment of a call for voice data packet transmission via a computer network (for example, an IP protocol-based network) (for example, during the signaling process for establishing a voice session), the calling parties can determine whether the voice session to be established involves an international call by identifying the calling party's and/or called party's numbers (for example, telephone numbers), and if it is determined that the session involves an international call, the hop limit value for voice data packet transmission during the said call shall be set to a value larger than the default hop limit value, thereby avoiding inappropriate voice packet loss.

The following section will elaborate the embodiments of the present disclosure with reference to the drawings.

Figure 2:
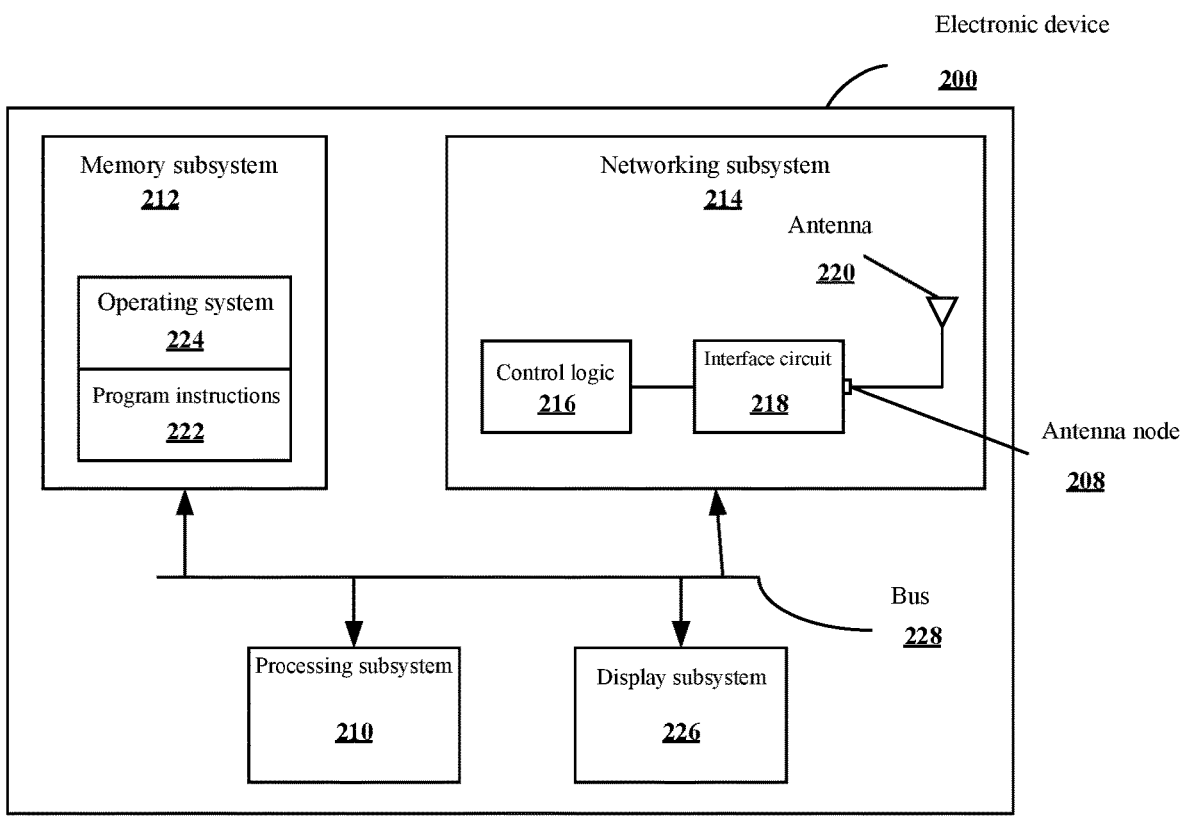
FIG. 2 shows an exemplary configuration of an electronic device that can realize an embodiment according to the present disclosure.

FIG. 2 shows an exemplary configuration of an electronic device that can realize an embodiment according to the present disclosure. The electronic device 200 shown in FIG. 2 may be used as the network device according to the present disclosure. The electronic device 200 comprises a processing subsystem 210, a memory subsystem 212, and a networking subsystem 214. The processing subsystem 210 comprises one or a plurality of devices configured to perform computing operations. For example, the processing subsystem 210 may include one or a plurality of microprocessors, ASICs, microcontrollers, programmable logic devices, graphics processing units (GPU) and/or one or more digital signal processors (DSP).

The memory subsystem 212 includes one or more devices for storing data and/or storing instructions for the processing subsystem 210 and the networking subsystem 214. For example, the memory subsystem 212 may include a dynamic random-access memory (DRAM), a static random-access memory (SRAM), and/or other types of memory (sometimes collectively or individually referred to as "computer-readable storage medium"). In some embodiments, the instructions used in the memory subsystem 212 of the processing subsystem 210 comprise: one or a plurality of program modules or instruction sets (e.g., program instruction 222 or operating system 224), which can be executed by the processing subsystem 210. In addition, an instruction in the various modules of the memory subsystem 212 may be implemented by the following: advanced programming languages, object-oriented programming languages and/or assembly or machine languages. Furthermore, the programming language can be compiled or interpreted, for example, configurable or configured (used interchangeably in the discussion hereof) so as to be executed by the processing subsystem 210.

In addition, the memory subsystem 212 may comprise mechanism for controlling access to memory. In some embodiments, the memory subsystem 212 includes a memory hierarchy, and the memory hierarchy includes one or a plurality of high-speed caches coupled to the memory in the electronic device 200. In some of these embodiments, one or a plurality of the high-speed caches are located in the processing subsystem 210.

The networking subsystem 214 includes one or a plurality of devices that are configured to be coupled to and/or communicate over wired and/or wireless networks (i.e., to perform network operations), comprising: a control logic 216, an interface circuit 218, and one or a plurality of antennas 220 (or antenna elements). (Although FIG. 2 includes one or more antennas 220, in some embodiments, the electronic device 200 includes one or more nodes that can be coupled to one or more antennas 220, such as node 208, for example, a bonding pad. Therefore, the electronic device 200 may or may not include one or more antennas 220.) For example, the networking subsystem 214 may include the Bluetooth networking system, cellular networking system (for example, 3G/4G/5G networks, such as UMTS, LTE, etc.), USB networking system, networking system based on the standards described in IEEE 802.11 (for example, Wi-Fi networking system), Ethernet networking system, and/or another networking system.

In some embodiments, the pattern shaper (such as reflector) in one or more antennas 220 (or antenna elements) may be used to adapt or change the radiation pattern of the transmitting antenna of the electronic device 200. The said one or more antennas 220 may be independently and selectively electrically coupled to the ground to direct the radiation pattern of the transmitting antenna to different directions.

The networking subsystem 214 includes a processor, controller, radio device/antenna, socket/plug and/or other devices for coupling to each supported network system, communicating on each supported network system, and processing the data and events for each supported network system. Please note that sometimes the network for coupling to each network system, and the mechanisms used to communicate on that network, and process data and events on that network are collectively referred to as the "network interface" of the network system. Furthermore, in some embodiments, the "network" or "connection" between electronic devices does not yet exist. Therefore, the electronic device 200 can use the mechanism in the networking subsystem 214 to perform simple wireless communication between electronic devices, e.g., sending frames and/or scanning frames sent by other electronic devices.

In the electronic device 200, a bus 228 is used to couple the processing subsystem 210, the memory subsystem 212, and the networking subsystem 214 together. Bus 228 may comprise electrical, optical, and/or electro-optical connections of the subsystems through which commands, data and the like may be transmitted. Although only one bus 228 is shown for clarity, different embodiments may comprise different numbers or configurations of electrical, optical, and/or electro-optical connections in the subsystems.

In some embodiments, the electronic device 200 optionally includes a display subsystem 226 for showing information on a display device, which may include a display driver and a display, such as a liquid crystal display, a multi-touch screen, etc.

The electronic device 200 may be (or may be included in) any electronic device having at least one network interface. For example, the electronic device 200 can be (or can be included in): transceivers, controllers, wireless nodes, communication equipment, test equipment, smart watches, wearable devices, consumer electronics and/or other electronic devices.

Although specific components are used to describe the electronic device 200, in an alternative embodiment, there may be different components and/or subsystems in the electronic device 200. For example, the electronic device 200 may include one or a plurality of additional processing subsystems, memory subsystems, networking subsystems, and/or display subsystems. In addition, one or a plurality of the subsystems may not exist in the electronic device 200.

Moreover, in some embodiments, the electronic device 200 may include one or a plurality of additional subsystems not shown in FIG. 2. In addition, although separate subsystems are shown in FIG. 2, in some embodiments, some or all of the given subsystems or components may be integrated into one or a plurality of the other subsystems or components in the electronic device 200. For example, in some embodiments, the program instruction 222 is incorporated in the operating system 224, and/or the control logic 216 is incorporated in the interface circuit 218.

Moreover, any combination of analog and/or digital circuits may be used to enable the circuit and components in the electronic device 200.

Integrated circuits (sometimes referred to as "communication circuits" or "devices for communication") can achieve some or all of the functions of the networking subsystem 214. The integrated circuit may include hardware and/or software mechanisms, and is used to transmit wireless signals from the electronic device 200 and receive signals at the electronic device 200 from other electronic devices. In addition to the mechanisms described herein, radio devices are generally known in the art, and therefore will not be elaborated. Generally, the networking subsystem 214 and/or the integrated circuit may include any number of radio devices. Note that the radio devices in the multiple radios embodiment function in a manner similar to the single radio embodiment described.

In some embodiments, the networking subsystem 214 and/or integrated circuit includes a configuration mechanism (e.g., one or a plurality of hardware and/or software mechanisms) that configures the radio device for transmission and/or reception on a given communication channel (e.g., a given carrier frequency).

Figure 3:
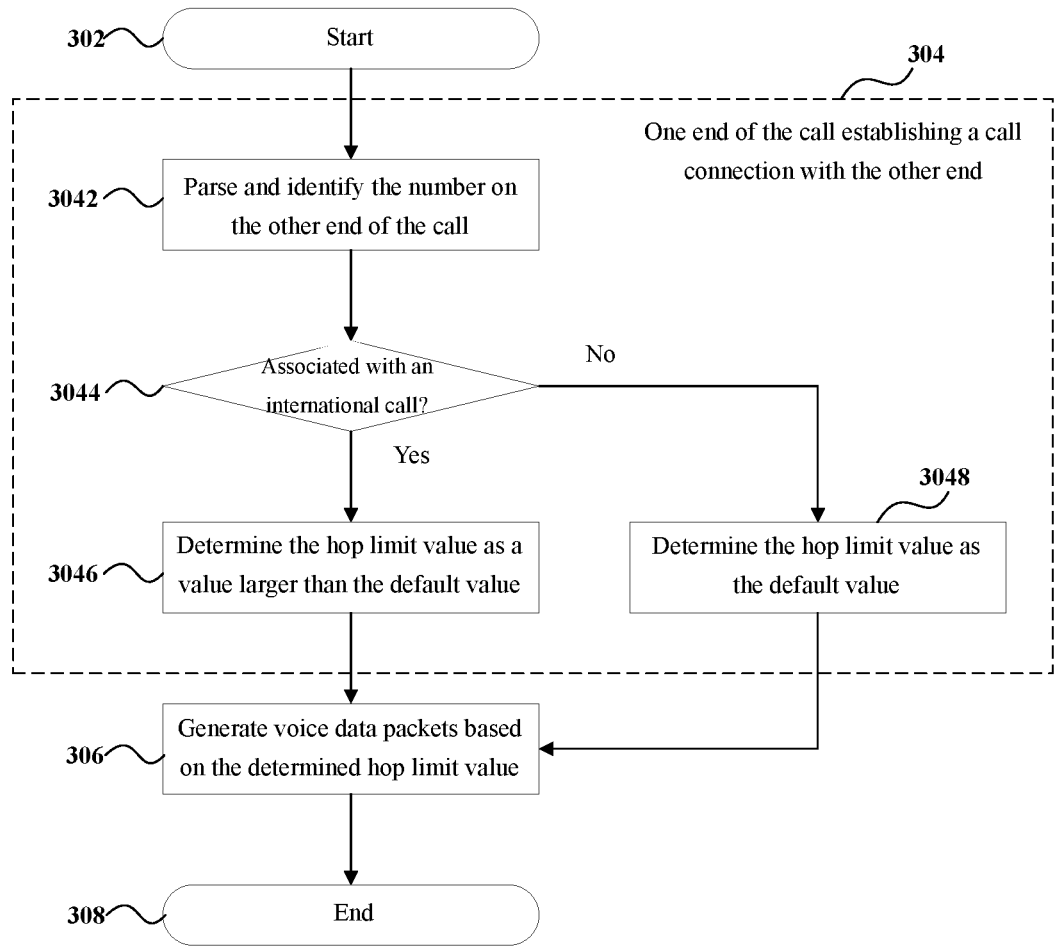
FIG. 3 is a schematic diagram of a flowchart of a method for voice data transmission according to an embodiment of the present disclosure.

FIG. 3 is a schematic diagram of a flowchart of a method for voice data transmission according to an embodiment of the present disclosure.

This method may be executed by [an electronic device], such as the electronic device 200 described in FIG. 2. As described with reference to FIG. 2, the electronic device 200 may be implemented as software, hardware, or a combination of software and hardware. In particular, such an electronic device may be an embedded phone or any client device running an Internet phone application (such as a VoIP application or a video conference application). More specifically, this method can be implemented as a computer program product (for example, a software application), which can be stored in a storage medium, and when executed by the processor of the electronic device 200, can implement the method for voice data transmission according to an embodiment of the present disclosure. As shown in FIG. 3, the operation of the method 300 starts at 302.

At 304, the electronic device 200 (as one end of the call) establishes a call connection with another device (as the other end of the call) for voice data transmission. For example, the process of establishing a call connection may be a process of establishing a voice session between the calling party and the called party through signal transmission. In the process of establishing a call connection, the calling party can identify the called party based on the number entered by the user that is associated with the called party (for example, telephone number), and the called party can identify the calling party based on the calling party's number (for example, telephone number) included in the signaling packet.

According to the present disclosure, in the process of establishing a call connection, whether as the calling party or the called party, the number used to identify the other end of the call may be parsed, and the hop limit value to be used in the subsequent voice data packet transmission may be determined based on the parsing results. Specifically, the calling party can directly parse the number entered by the user, and the called party can parse the number included in the received signal that identifies the calling party.

As shown in step 3042 of FIG. 3, the electronic device 200 can parse and identify the number of the other end of the call to determine whether the voice data transmission is associated with an international call.

The number can be parsed in various ways. According to an embodiment, a country code list may be prestored in the electronic device 200 acting as the calling party's or called party's device. In this case, parsing the number includes determining whether the country code contained in the said number matches any country code in the country code list stored, and responding to the said number with a country code matching any country code in the country code list to confirm that the voice data transmission is associated with an international call.

The country code may be based on, for example, a code assigned to a country or special administrative region by the International Telecommunication Union according to the E.164 standard (this code is generally referred to as the international dialing code). For example, the country code may be in the form of a predetermined code with a suffix based on the international dialing code assigned to a country or special administrative region by the International Telecommunication Union according to the E.164 standard (for example, "country code"="predetermined code"+"international dialing code"). Here, the predetermined code (or, in some cases, also referred to as the international prefix code), for example, refers to a predetermined string, and is not limited to a numeric code. For example, the predetermined code may be "00" or "+". In particular, when the calling party makes a call, the country code in the number entered by the user to identify the called party, usually starts with "00" When the called party answers the call, the country code in the number contained in the signaling packet received from the calling party to identify the calling party, usually starts with "+". For example, the country code of China can be 0086 or +86, the country code of the United States can be 001 or +1, and so on. It should be noted that the description of the predetermined code here is not restrictive; the predetermined code can also be any other predetermined string used, and for the case where the call is initiated by the calling party and answered by the called party, the predetermined code entered by the user and the predetermined code contained in the signaling packet may be the same, for example, both are "00".

The number string can be analyzed to determine whether it contains a country code that matches any country code in the stored country code list. For example, the country code is generally located at the beginning of the number used to identify the calling party or called party of a call. Therefore, as an example, the beginning of the number can be compared with each item in the stored country code list character by character to determine whether there is any match. In addition, as another example, the complete country code string can be extracted from the number string, and the extracted string can be compared with each string in the stored country code list subsequently to determine whether it matches any country code string.

A response to the number used to identify the calling party or called party that contains a country code matching any country code in the country code list confirms that the voice data transmission is associated with an international call.

Otherwise, it is determined that the voice data transmission is not associated with an international call. There may be many situations where the country code contained in the number used for identifying the calling party or called party does not match any country code in the country code list. For example, the number does not contain any country code (this is usually default home country/local area call), or the country code contained in the number (for example, the local country code) does not exist in the stored country code list.

Figure 4:
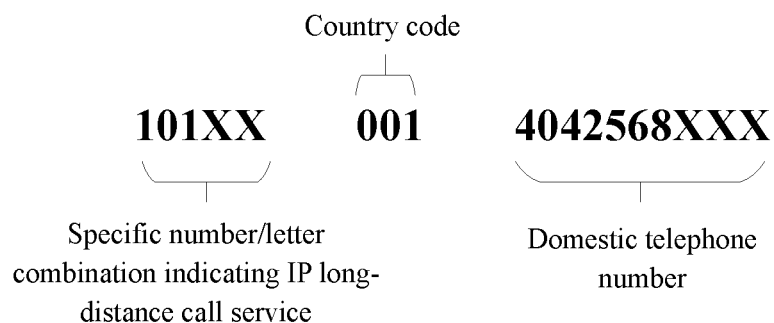
FIG. 4 shows an example of a number including a letter/number combination that indicates a specific service and/or tariff.

In some exceptional cases, in order to obtain specific services and/or tariffs (for example, services and/or tariffs dedicated to IP telephony), the user may enter a specific number/letter combination before entering the main part of the number (i.e., a number dedicated to identifying the calling party that is compliant with international/national or regional regulations) to indicate that this call is associated with the service and/or tariff represented by the specific number/letter combination. FIG. 4 shows a specific example of this situation. As shown in FIG. 4, before the main part of the number starting with "001" that is used to identify the calling party located in the United States, there is a string "101XX" to indicate that the call is associated with a specific IP long-distance call service. Therefore, in this case, the country code needs to be determined based on the remaining number string after excluding the specific number/letter combination.

In this case, a list of numbers/letters indicating specific services and/or tariffs may also be prestored in the electronic device 200 acting as the calling party's or called party's device. The electronic device 200 can, for example, first compare the beginning part of the number string contained in the signaling packet transmitted/received by the user with the items in the list of number/letter combinations, to obtain the remaining string after excluding the number/letter combination of the specific service and/or tariff, and then determine whether the call involves an international call based on the remaining string, using any of the aforementioned string-by-string comparison methods or the country code extraction comparison method.

In addition, when the length of each number/letter combination indicating each service and/or tariff is the same (for example, the five characters shown in FIG. 4), the electronic device 200 acting as the calling party or called party device, can also directly exclude one or more characters from the beginning of the number string contained in the signaling packet transmitted/received by the user according to the number of characters of the said number/letter combination to obtain the remaining string, and then determine whether the call involves an international call based on the remaining string, using any of the aforementioned string-by-string comparison methods or the country code extraction comparison method.

It should be noted that the exclusion of a part of the string described herein does not necessarily mean the formation of a new string. For example, the operation of identifying/matching the country code can also be performed from a specific position from the beginning of the number string contained in the signaling packet transmitted/received by the user, and the specific position may be the position where the numeric/letter combination string indicating the service and/or tariff ends.

Advantageously, this method of parsing and identifying a party's number based on a comparison of a pre-stored country code list can quickly and effectively determine whether the call involves an international call by means of simple string comparison.

As described above, the country code may be in the form of a predetermined code (for example, "00" or "+") with a suffix based on a code assigned to a country or special administrative region by the International Telecommunication Union according to the E.164 standard. In other words, the country code is generally a specific code starting with a predetermined code (for example, "00" or "+"). As further explained above, the country code is generally located at the beginning of the main part of the number used to identify the calling party or called party of the call. The main part is a number dedicated to identifying the calling party that is compliant with international/national or regional regulations. For example, the main part can be the entire number string included in the signaling packet transmitted/received by the user, or the main part can be the part immediately following the specific number/letter combination representing a specific service and/or tariff in the entire number string included in the signaling packet transmitted/received by the user. In particular, in order to enable both parties to the call to properly identify the specific number/letter combination representing a specific service and/or tariff and the country code immediately following it, this specific number/letter combination is generally configured to not include a predetermined code dedicated to the country code (for example, the string "00" or "+").

In addition, when the call involves a home country/local area call, usually the calling party does not need to enter the country code of the home country/local area to call the called party, and the calling party's number included in the signaling packet received by the called party also does not include the country code of the home country/local area.

Therefore, according to another embodiment, the aforementioned feature of the country code and the feature of omitting the country code of both the calling and called parties when calling in the home country/local area can be used to determine whether the voice data transmission is associated with an international call. Specifically, the number string contained in the signaling packet transmitted/received by the user can be parsed to determine whether the main part of the said number starts with the aforementioned predetermined code (for example, the string "00" or "+"), and a response to the main part of the said number starting with the predetermined code confirms that the voice data transmission is associated with an international call. In this embodiment, the main part of the number can be determined in a manner similar to the above. For example, the main part of the number may be determined based on a list of number/letter combinations indicating specific services and/or tariffs that are pre-stored in the electronic device 200 acting as the calling party's or called party's device. Quoting another example, the main part of the number can also be determined according to the character length of a number/letter combination indicating a specific service and/or tariff.

Advantageously, in this scheme of identifying whether a call involves an international call based on a predetermined code, there is no need to pre-store any country code list in the calling party's and called party's devices, thereby simplifying the configuration operation of the sources of the calling party and the called party and saving storage space. This is particularly advantageous for usage scenarios where the method according to the present disclosure is implemented as a computer program product such as a software application or an embedded application, because the method according to the present disclosure can be implemented in a "lighter" manner.

With continued reference to FIG. 3, the electronic device 200 can determine the hop limit value for voice data transmission based on the parsing result of the number. In step 3044, the electronic device 200 can determine whether the voice data transmission is associated with an international call based on the parsing result in step 3042. As shown in step 3048, in response to the confirmation that the voice data transmission is not associated with an international call upon parsing the number, the hop limit value for the voice data transmission is determined as the default hop limit value. Here, the hop limit value may be, for example, the value of the Time-to-Live (TTL) field specified in the IPv4 protocol. It should be understood that, according to the present disclosure, the hop limit value may be any value of a field that limits the number of packet transmission hops or forwarding times. For example, the hop limit value may also be the value of the Hop Limit field specified in the IPv6 protocol. The field storing the hop limit value is generally located in the IP packet header. The length of this field is generally 8 bits, so its maximum value is 255. The default hop limit value may depend on the value of the operating system, and its typical value is 64, for example.

As shown in step 3046, in response to the confirmation that the voice data transmission is associated with an international call upon parsing the number, the electronic device 200 may determine the hop limit value for voice data transmission to be a first value greater than the default hop limit value. According to the present disclosure, in order to have a trade-off between "reducing packet loss" and "preventing ping-pong/loop routing", the first value can be determined to be slightly larger than the default hop limit value but less than the maximum value allowed by the hop limit field (i.e. 255). In other words, the first value may be determined to be a value smaller than a predetermined threshold, which is smaller than the maximum hop limit value specified by the protocol used to establish the said call connection.

According to the present disclosure, the aforementioned first value or the aforementioned predetermined threshold associated with the hop limit value may be preset by the user or administrator of the electronic device 200. For example, the aforementioned first value or the aforementioned predetermined threshold associated with the hop limit value may be preset when the electronic device 200 is initialized or configured, or more particularly when the software application implementing the method according to the present disclosure is initialized or configured. In the case that the aforementioned predetermined threshold is set in advance, in response to the confirmation that the voice data transmission is associated with an international call upon parsing the number, the electronic device 200 can automatically select a first value randomly from values greater than the default value of the hop limit and less than or equal to a preset threshold as the hop limit value to be used for voice data transmission.

With continued reference to FIG. 3, next, in step 306, the electronic device 200 generates one or more packets for transmitting voice data based on the hop limit value determined when the said call connection is established. For example, the voice data to be sent may be encapsulated in a real-time transport protocol (RTP) packet, and the RTP packet may be encapsulated in an IP packet whose corresponding field in the header part is set to the determined hop limit value. Here, RTP is taken as an example to illustrate the protocol used to encapsulate voice data. However, the present disclosure is not limited to using RTP to encapsulate voice data; voice data encapsulation can be based on any appropriate protocol (for example, any applicable application layer protocol). In addition, voice data packets at the application layer can be encapsulated according to any appropriate network layer protocol, and the value of the field that limits the number of forwarding hops in the header of the network layer packet used is set to a value determined according to the aforementioned method (for example, the aforementioned first value or the default value of this field).

The method ends at 308.

The scheme for voice data transmission according to the present disclosure has been explained in detail above. With the scheme of the present disclosure, it is possible to flexibly adjust the hop count/forwarding limit of the voice data packet transmission according to the calling parties involved in the voice data transmission, thereby avoiding inappropriate packet loss due to the nature of the call (such as a long-distance call). In addition, the scheme of the present disclosure allows the hop count/forwarding limit of the voice data packet transmission in a specific situation (for example, international calls) to be set to a value slightly larger than the default hop limit value, therefore, the infinite loop of data packets in the closed loop of the network transmission can still be effectively prevented.

The scheme of the present disclosure has been explained with reference to the drawings. The present disclosure may be realized as any combination of devices, systems, integrated circuits, and computer programs on non-transitory computer-readable media. One or a plurality of processors can be realized as an integrated circuit (IC), an application specific integrated circuit (ASIC) or a large-scale integrated circuit (LSI), a system LSI, or a super LSI or super LSI component that performs part or all of the functions described in this disclosure.

The present disclosure includes the use of software, applications, computer programs, or algorithms. Software, application programs, computer programs or algorithms can be stored on a non-transitory computer-readable medium, so that a computer with one or a plurality of processors can execute the aforementioned steps and the steps described in the attached drawings. For example, one or a plurality of memory store software or algorithms by executable instructions, and one or a plurality of processors can associate the execution of a set of instructions of the software or algorithms to provide monitoring and installation enhancement in any number of wireless networks according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned realization technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations be executed to achieve the desired result. In some cases, multitasking and parallel processing can be advantageous.

The invention claimed is:

1. A device for voice data transmission, comprising:
  a memory, the memory storing computer-executable instructions; and
  a processor configured to execute the computer-executable instructions:
    establish a call connection for the voice data transmission with another device, wherein the establishing the call connection comprises:
      parsing and identifying a number of the another device to determine whether the voice data transmission is associated with an international call;
      in response to the confirmation that the voice data transmission is associated with an international call upon parsing the number, determining a hop limit value for the voice data transmission as a first value greater than a default hop limit value;
      in response to the confirmation that the voice data transmission is not associated with the international call upon parsing the number, determining the hop limit value for the voice data transmission as the default hop limit value; and
    generating one or more packets for sending voice data of the voice data transmission based on the hop limit value determined when the call connection is established.

2. The device according to claim 1, wherein parsing and identifying the number of the another device comprises:
  determining whether a country code contained in the number matches any country code in the country code list stored in the device, and
  responding to the number with a country code matching any country code in the country code list to confirm that the voice data transmission is associated with an international call.

3. The device according to claim 1, wherein parsing and identifying the number of the another device comprises:
  determining whether the main part of the number starts with a predetermined code, and
  responding to the number with the main part starting with the predetermined code to confirm that the voice data transmission is associated with an international call.

4. The device according to claim 1, wherein the first value is less than a predetermined threshold, the predetermined threshold is less than the maximum hop limit value specified by the protocol used to establish the call connection, the first value is a pre-configured value, or both.

5. The device according to claim 1, wherein the device is a calling party's device or a called party's device of a call.

6. The device according to claim 1, wherein the hop limit value is the Time-to-Live (TTL) value.

7. A method for voice data transmission, which comprises:
  establishing a call connection for the voice data transmission between one end of a call and an other end of the call, wherein the establishing the call connection comprises:
    parsing and identifying a number of the other end to determine whether the voice data transmission is associated with an international call;
    in response to the confirmation that the voice data transmission is associated with an international call upon parsing the number, determining a hop limit value for the voice data transmission as a first value greater than a default hop limit value;
    in response to the confirmation that the voice data transmission is not associated with an international call upon parsing the number, determining the hop limit value for the voice data transmission as the default hop limit value; and
  generating one or more packets for sending voice data of the voice data transmission based on the hop limit value determined when the call connection is established.

8. The method according to claim 7, wherein parsing and identifying the number of the other end comprises:
  determining whether a country code contained in the number matches any country code in the country code list stored in the device, and
  responding to the number with a country code matching any country code in the country code list to confirm that the voice data transmission is associated with an international call.

9. The method according to claim 7, wherein parsing and identifying the number of the other end comprises:
  determining whether the main part of the number starts with a predetermined code, and
  responding to the number with the main part starting with the predetermined code to confirm that the voice data transmission is associated with an international call.

10. The method according to claim 7, wherein the first value is less than a predetermined threshold, the predetermined threshold is less than the maximum hop limit value specified by the protocol used to establish the call connection, the first value is a pre-configured value, or both.

11. The method according to claim 7, wherein the method is implemented by the calling party or the called party of the call.

12. The method according to claim 7, wherein the hop limit value is the Time-to-Live (TTL) value.

13. A non-transitory computer program product, comprising a computer program or instructions, characterized in that, when the computer program or instructions are executed by a processor, the steps of the method according to claim 7 is realized.

14. A non-transitory computer-readable medium of a device storing computer-executable instructions; for voice data transmission, which when executed by a processor of the device, cause the device to perform one or more operations comprising:
 establishing a call connection for the voice data transmission with one end of a call and an other end of the call, wherein the establishing the call connection comprises:
  parsing and identifying a number of the other end of the call to determine whether the voice data transmission is associated with an international call, and
  in response to the confirmation that the voice data transmission is associated with an international call upon parsing the number, the determining a hop limit value for the voice data transmission as a first value greater than a default hop limit value;
  in response to the confirmation that the voice data transmission is not associated the an international call upon parsing the number, determining the hop limit value for the voice data transmission is determined as the default hop limit value; and
 generating one or more packets for sending voice data of the voice data transmission based on the hop limit value determined when the call connection is established.

15. The non-transitory computer-readable medium according to claim 14, wherein parsing and identifying the number of the other end comprises: determining whether a country code contained in the number matches any country code in the country code list stored in the device, and responding to the number with a country code matching any country code in the country code list to confirm that the voice data transmission is associated with an international call.

16. The non-transitory computer-readable medium according to claim 14, wherein parsing and identifying the number of the other end comprises: determining whether the main part of the number starts with a predetermined code, and responding to the number with the main part starting with the predetermined code to confirm that the voice data transmission is associated with an international call.

17. The non-transitory computer-readable medium according to claim 14, wherein the first value is less than a predetermined threshold, the predetermined threshold is less than the maximum hop limit value specified by the protocol used to establish the call connection, the first value is a pre-configured value, or both.

18. The non-transitory computer-readable medium according to claim 14, wherein the method is implemented by the calling party or the called party of the call.

19. The non-transitory computer-readable medium according to claim 14, wherein the hop limit value is the Time-to-Live (TTL) value.

\* \* \* \* \*